United States Patent
Mola

(10) Patent No.: US 10,296,442 B2
(45) Date of Patent: May 21, 2019

(54) DISTRIBUTED TIME-TRAVEL TRACE RECORDING AND REPLAY

(71) Applicant: Microsoft Technology Licensing, LLC, Redmond, WA (US)

(72) Inventor: Jordi Mola, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/637,376

(22) Filed: Jun. 29, 2017

(65) Prior Publication Data
US 2019/0004930 A1  Jan. 3, 2019

(51) Int. Cl.
G06F 9/44 (2018.01)
G06F 11/36 (2006.01)
G06F 11/34 (2006.01)

(52) U.S. Cl.
CPC ...... *G06F 11/3636* (2013.01); *G06F 11/3409* (2013.01); *G06F 11/3466* (2013.01)

(58) Field of Classification Search
CPC ............ G06F 11/3636; G06F 11/3476; G06F 11/3466; G06F 11/3612
See application file for complete search history.

(56) References Cited

U.S. PATENT DOCUMENTS

| | | |
|---|---|---|
| 4,598,364 A | 7/1986 | Gum et al. |
| 5,381,533 A | 1/1995 | Peleg et al. |
| 5,905,855 A | 5/1999 | Klaiber et al. |
| 5,944,841 A | 8/1999 | Christie |
| 6,009,270 A | 12/1999 | Mann |
| 6,094,729 A | 7/2000 | Mann |
| 6,101,524 A | 8/2000 | Choi et al. |
| 6,167,536 A | 12/2000 | Mann |
| 6,351,844 B1 | 2/2002 | Bala |
| 6,480,886 B1 | 11/2002 | Paice |
| 6,553,511 B1 | 4/2003 | Dekoning et al. |
| 6,634,011 B1 | 10/2003 | Peltier et al. |
| 6,728,949 B1 | 4/2004 | Bryant et al. |
| 6,772,324 B2 | 8/2004 | Akkary et al. |
| 6,854,108 B1 | 2/2005 | Choi |

(Continued)

OTHER PUBLICATIONS

Pavel Dovgalyuk, Deterministic Replay of System's Execution with Multi-target QEMU Simulator for Dynamic Analysis and Reverse Debugging, 2012, retrieved online on Jun. 1, 2018, pp. 1-4. Retrieved from the Internet: <URL: https://pdfs.semanticscholar.org/259f/f151c4f79cdc5ec593bec29650c9643c6043.pdf>. (Year: 2012).*

(Continued)

*Primary Examiner* — Hanh Thi-Minh Bui
(74) *Attorney, Agent, or Firm* — Workman Nydegger

(57) ABSTRACT

Distributed trace recording and replay is based on tracing execution of a first entity at a first computer system, while also concurrently and independently tracing execution of a second entity at a second computer system. The traces include corresponding orderable events that occurred during execution of the entities at their corresponding computer systems, and are recorded at fidelity that enables complete replay of the recorded execution of the entities. Each trace includes information that at least partially orders, among the respective orderable events, sending or receipt of at least one message passed between the entities.

19 Claims, 7 Drawing Sheets

(56) References Cited

U.S. PATENT DOCUMENTS

| | | | |
|---|---|---|---|
| 7,055,070 B1 | 5/2006 | Uhler et al. | |
| 7,089,400 B1 | 8/2006 | Pickett et al. | |
| 7,178,133 B1 | 2/2007 | Thekkath | |
| 7,181,728 B1 | 2/2007 | Thekkath | |
| 7,380,253 B2* | 5/2008 | Yamauchi | G11B 33/08 720/651 |
| 7,448,025 B2 | 11/2008 | Kalafatis et al. | |
| 7,454,486 B2 | 11/2008 | Kaler et al. | |
| 7,478,394 B1 | 1/2009 | de Dinechin et al. | |
| 7,620,938 B2 | 11/2009 | Edwards et al. | |
| 7,676,632 B2 | 3/2010 | Miller | |
| 7,877,630 B1 | 1/2011 | Favor et al. | |
| 7,958,497 B1 | 6/2011 | Lindo et al. | |
| 7,984,129 B2 | 7/2011 | Vaught | |
| 8,010,337 B2 | 8/2011 | Narayanan et al. | |
| 8,087,017 B1 | 12/2011 | Whaley et al. | |
| 8,296,775 B2 | 10/2012 | Thornton et al. | |
| 8,423,965 B2 | 4/2013 | Goel et al. | |
| 8,468,501 B2 | 6/2013 | Subhraveti | |
| 8,484,516 B2 | 7/2013 | Giannini et al. | |
| 8,499,200 B2 | 7/2013 | Cathro | |
| 8,543,988 B2 | 9/2013 | Shimazaki et al. | |
| 8,612,650 B1 | 12/2013 | Carrie et al. | |
| 8,719,796 B2 | 5/2014 | Rosu et al. | |
| 8,769,511 B2 | 7/2014 | Gal et al. | |
| 8,832,682 B2 | 9/2014 | Xu et al. | |
| 9,015,441 B2 | 4/2015 | Worthington et al. | |
| 9,058,415 B1 | 6/2015 | Serebrin et al. | |
| 9,164,809 B2 | 10/2015 | Tsirkin et al. | |
| 9,268,666 B2 | 2/2016 | Law et al. | |
| 9,280,379 B2 | 3/2016 | Tsirkin et al. | |
| 9,300,320 B2 | 3/2016 | Ansari et al. | |
| 9,329,884 B2 | 5/2016 | Strong et al. | |
| 9,361,228 B2 | 6/2016 | Turner et al. | |
| 9,535,815 B2 | 1/2017 | Smith et al. | |
| 9,569,338 B1 | 2/2017 | Bradbury et al. | |
| 9,767,237 B2 | 9/2017 | Suresh et al. | |
| 9,934,127 B1 | 4/2018 | Mola et al. | |
| 2002/0078124 A1 | 6/2002 | Baylor et al. | |
| 2002/0124237 A1 | 9/2002 | Sprunt et al. | |
| 2002/0144101 A1 | 10/2002 | Wang et al. | |
| 2003/0079205 A1 | 4/2003 | Miyao et al. | |
| 2003/0126508 A1 | 7/2003 | Litt | |
| 2003/0233636 A1 | 12/2003 | Crawford | |
| 2004/0117690 A1 | 6/2004 | Andersson | |
| 2004/0243894 A1* | 12/2004 | Smith | G06F 11/364 714/724 |
| 2005/0155019 A1 | 7/2005 | Levine et al. | |
| 2005/0223364 A1 | 10/2005 | Perri et al. | |
| 2006/0036579 A1* | 2/2006 | Byrd | G06Q 10/10 |
| 2006/0112310 A1 | 5/2006 | McHale et al. | |
| 2006/0230390 A1 | 10/2006 | Alexander et al. | |
| 2007/0106287 A1 | 5/2007 | O'sullivan | |
| 2007/0106827 A1 | 5/2007 | Boatright et al. | |
| 2007/0130237 A1 | 6/2007 | Altman et al. | |
| 2007/0150881 A1 | 6/2007 | Khawand et al. | |
| 2007/0168989 A1 | 7/2007 | Edwards et al. | |
| 2007/0186055 A1 | 8/2007 | Jacobson et al. | |
| 2007/0214342 A1 | 9/2007 | Newburn et al. | |
| 2007/0220361 A1 | 9/2007 | Barnum et al. | |
| 2008/0065810 A1 | 3/2008 | Spanel et al. | |
| 2008/0091867 A1 | 4/2008 | Plondke et al. | |
| 2008/0114964 A1 | 5/2008 | Davis et al. | |
| 2008/0115113 A1 | 5/2008 | Codrescu et al. | |
| 2008/0140935 A1 | 6/2008 | Cypher et al. | |
| 2008/0215920 A1 | 9/2008 | Mayer et al. | |
| 2008/0250207 A1 | 10/2008 | Davis et al. | |
| 2008/0256396 A1 | 10/2008 | Giannini et al. | |
| 2008/0270745 A1 | 10/2008 | Saha et al. | |
| 2008/0288826 A1 | 11/2008 | Nemoto | |
| 2009/0006729 A1 | 1/2009 | Piazza et al. | |
| 2009/0013133 A1 | 1/2009 | Cypher et al. | |
| 2009/0031173 A1 | 1/2009 | Al-Omari et al. | |
| 2009/0037886 A1 | 2/2009 | McCoy et al. | |
| 2009/0106278 A1 | 4/2009 | Ramacher et al. | |
| 2009/0138859 A1 | 5/2009 | Chen et al. | |
| 2009/0144742 A1 | 6/2009 | Subhraveti et al. | |
| 2009/0319753 A1 | 12/2009 | Welc et al. | |
| 2010/0106912 A1 | 4/2010 | Cypher et al. | |
| 2010/0162247 A1 | 6/2010 | Welc et al. | |
| 2010/0205484 A1 | 8/2010 | Dragicevic et al. | |
| 2010/0223446 A1 | 9/2010 | Katariya et al. | |
| 2010/0250856 A1 | 9/2010 | Owen et al. | |
| 2010/0251031 A1 | 9/2010 | Nieh et al. | |
| 2010/0268995 A1 | 10/2010 | Goodman et al. | |
| 2011/0271070 A1 | 11/2011 | Worthington et al. | |
| 2011/0276761 A1 | 11/2011 | Saha et al. | |
| 2011/0288847 A1 | 11/2011 | Narayanan et al. | |
| 2012/0095728 A1 | 4/2012 | Ubukata | |
| 2013/0036403 A1 | 2/2013 | Geist | |
| 2013/0086567 A1 | 4/2013 | Inoue et al. | |
| 2014/0040557 A1 | 2/2014 | Frey et al. | |
| 2014/0059523 A1 | 2/2014 | Frazier et al. | |
| 2014/0215443 A1 | 7/2014 | Voccio et al. | |
| 2014/0281710 A1 | 9/2014 | Cain et al. | |
| 2014/0372987 A1 | 12/2014 | Strong et al. | |
| 2015/0012699 A1 | 1/2015 | Rizzo et al. | |
| 2015/0089155 A1 | 3/2015 | Busaba et al. | |
| 2015/0089301 A1 | 3/2015 | Laurenti | |
| 2015/0319221 A1 | 11/2015 | Zmievski et al. | |
| 2015/0355996 A1 | 12/2015 | Smith et al. | |
| 2015/0378870 A1* | 12/2015 | Marron | G06F 11/362 717/128 |
| 2016/0283748 A1 | 9/2016 | Oh et al. | |
| 2016/0292061 A1 | 10/2016 | Marron et al. | |
| 2017/0052876 A1 | 2/2017 | Svensson et al. | |
| 2017/0140082 A1 | 5/2017 | Suresh et al. | |
| 2017/0161173 A1 | 6/2017 | Bradbury et al. | |
| 2017/0192886 A1 | 7/2017 | Boehm et al. | |
| 2017/0286111 A1 | 10/2017 | Pereira et al. | |
| 2018/0060214 A1 | 3/2018 | Mola | |
| 2018/0113806 A1 | 4/2018 | Mola | |
| 2018/0136869 A1 | 5/2018 | Mola | |
| 2018/0285136 A1 | 10/2018 | Mola | |
| 2018/0314623 A1 | 11/2018 | Mola | |
| 2019/0018755 A1 | 1/2019 | Mola | |

OTHER PUBLICATIONS

Arkaprava Basu et al., Karma: Scalable Deterministic Record-Replay, ACM, 2011, retrieved online on Jun. 1, 2018, pp. g 359-g 368. Retrieved from the Internet: <URL: http://delivery.acm.org/10.1145/2000000/1995950/p359-basu.pdf?>. (Year: 2011).*

Grabner, Andreas, "Tracing is the new Debugging in Distributed App Development", https://www.dynatrace.com/blog/tracing-is-the-new-debugging-in-distributed-app-development/, Published on: Dec. 13, 2016, 14 pages.

"Monitoring redefined", https://www.dynatrace.com/blog/tracing-is-the-new-debugging-in-distributed-app-development/, Retrieved on: Jun. 14, 2017, 14 pages.

"7 Recording Inferior's Execution and Replaying It", Retrieved from https://sourceware.org/gdb/onlinedocs/gdb/Process-Record-and-Replay.html, dated: May 27, 2016, 6 Pages.

"Elm's Time Traveling Debugger", Retrieved from http://debug.elm-lang.org/, May 23, 2016, 3 Pages.

"IntelliTrace", Retrieved from: https://msdn.microsoft.com/en-us/library/dd264915.aspx, Nov. 3, 2016, 5 Pages.

"rr: Lightweight Recording & Deterministic Debugging", Retrieved from http://rr-project.org/, May 26, 2016, 4 Pages.

"Non-Final Office Action Issued in U.S. Appl. No. 15/252,998", dated: Sep. 20, 2017, 15 Pages.

"Non-final Office Action Issued in U.S. Appl. No. 15/253,027", dated: Oct. 10, 2017, 25 Pages.

"Non-final Office Action Issued in U.S. Appl. No. 15/349,555", dated: Oct. 6, 2017, 22 Pages.

Barr, et al., "Tardis: Affordable Time-Travel Debugging in Managed Runtimes", in ACM Sigplan Notices, vol. 49, Issue 10, Oct. 15, 2014, 16 Pages.

Bhansali, et al., "Framework for Instruction-level Tracing and Analysis of Program Executions", In Proceedings of the 2nd international conference on Virtual execution environments, Jun. 14, 2006, pp. 154-163.

(56) References Cited

OTHER PUBLICATIONS

Brady, Fiorenza, "Cambridge University Study States Software Bugs Cost Economy $312 Billion Per Year", Retrieved from http://www.prweb.com/releases/2013/1/prweb10298185.htm, Jan. 8, 2013, 4 Pages.
Charles, "Arun Kishan: Inside Windows 7- Farewell to the Windows Kernel Dispatcher Lock", Retrieved from https://channel9.msdn.com/Shows/Going+ Deep/Arun-Kishan-Farewell-to-the-Windows-Kernel-Dispatcher-Lock, Aug. 6, 2009, 9 Pages.
Dimitrov, et al., "Time-Ordered Event Traces: A New Debugging Primitive for Concurrency Bugs", In Proceedings of IEEE International Parallel & Distributed Processing Symposium (IPDPS), May 16, 2011, 11 Pages.
Guo, et al., "R2: An Application-Level Kernel for Record and Replay", In Proceedings of the 8th USENIX Conference on Operating Systems Design and Implementation, Dec. 8, 2008, 16 Pages.
Hower, et al., "Two Hardware-based Approaches for Deterministic Multiprocessor Replay", In Proceedings of the Communications of the ACM, vol. 52, Issue 6, Jun. 1, 2009, pp. 93-100.
Jiang, et al., "Care: Cache Guided Deterministic Replay for Concurrent Java Programs", In Proceedings of the 36th International Conference on Software Engineering, May 31, 2014, 11 Pages.
King, et al., "Debugging Operating Systems with Time-traveling Virtual Machines", In Proceedings of Annual USENIX Technical Conference, Apr. 2005, 15 Pages.
Kleen, Andi, "Adding Processor Trace support to Linux", Retrieved from https://lwn.net/Articles/648154/, Jul. 1, 2015, 7 Pages.
Lai, et al., "A Versatile Data Cache for Trace Buffer Support", In Journal of IEEE Transactions on Circuits and Systems, vol. 61, dated Nov. 11, 2014, pp. 3145-3154.
Lee, et al., "Offline Symbolic Analysis for Multi-Processor Execution Replay", In Proceedings of the 42nd Annual IEEE/ACM International Symposium on Microarchitecture, Dec. 12, 2009, pp. 564-575.
Liang, et al., "Improved Procedure Placement for Set Associative Caches", In Proceedings of the International conference on Compilers, architectures and synthesis for embedded systems, Oct. 2010, 10 Pages.
Liang, et al., "Instruction Cache Locking Using Temporal Reuse Profile", In Proceedings of the 47th Design Automation Conference, Jun. 13, 2010, pp. 344-349.
Mercer, et al., "Model Checking Machine Code with the GNU Debugger", In Proceedings of the 12th international conference on Model Checking Software, Aug. 22, 2005, 15 Pages.
Narayanasamy, et al., "BugNet: Continuously Recording Program Execution for Deterministic Replay Debugging", In Proceedings of the 32nd Annual International Symposium on Computer Architecture, Jun. 4, 2005, 12 Pages.
"International Search Report and Written Opinion Issued in PCT Application No. PCT/US2017/048094", dated: Nov. 10, 2017, 12 Pages.
"International Search Report & Written Opinion Issued in PCT Application No. PCT/US2017/060075",dated: Feb. 28, 2018, 11 Pages.
Rivers, et al., "Utilizing Reuse Information in Data Cache Management", In Proceedings of the 12th international conference on Supercomputing, Jul. 13, 1998, pp. 449-456.
Sahuquillo, et al., "The Filter Cache: A Run-Time Cache Management Approach", In Proceedings of 25th Euromicro Conference, Sep. 8, 1999, 8 Pages.
Shaaban, et al., "Improving Trace Cache Hit Rates using the Sliding Window Fill Mechanism and Fill Select Table", In Proceedings of the workshop on Memory system performance, Jun. 8, 2004, pp. 36-41.
Sharma, Suchakrapani Dati., "Hardware Tracing with Intel Processor Trace", Retrieved from https://hsdm.dorsal.polymtl.ca/system/files/10Dec2015_0.pdf, Dec. 10, 2015, 30 Pages.
Tchagou, et al., "Reducing Trace Size in Multimedia Applications Endurance Tests", In Proceedings of Design, Automation & Test in Europe Conference & Exhibition (Date), Mar. 9, 2015, 2 Pages.
Uzelac, et al., "Hardware-Based Load Value Trace Filtering for On-the-Fly Debugging", In Proceedings of ACM Transactions on Embedded Computing Systems, vol. 12, dated May, 2, 2013, 18 Pages.
Xu, et al., "ReTrace: Collecting Execution Trace with Virtual Machine Deterministic Replay", In Proceedings of the 3rd Annual Workshop on Modeling, Benchmarking and Simulation, Jun. 2007, 8 Pages.
"Non Final Office Action Issued in U.S. Appl. No. 15/298,439", dated: Aug. 13, 2018, 8 Pages.
"Notice of Allowance Issued in U.S. Appl. No. 15/433,918", dated: Sep. 12, 2018, 9 Pages.
"Non Final Office Action Issued in U.S Appl. No. 15/488,282", dated: Oct. 19, 2018, 16 Pages.
Nance, et al., "Virtual Machine Introspection: Observation or Interference?", in Journal of IEEE Security & Privacy, vol. 6 , Issue 5, Sep. 1, 2008, pp. 32-37.
"International Search Report & Written Opinion Issued in PCT Patent Application No. PCT/US2018/024233", dated Sep. 4, 2018, 16 Pages.
"Notice of Allowance Issued in U.S. Appl. No. 15/604,334", dated: Jan. 3, 2019, 9 pages.
Hicks, et al., "Debugging Heterogeneous Applications with Pangaea", In Proceedings of the Sigmetrics on Parallel and Distributed Tools, Jan. 1, 1996, pp. 41-50.
"International Search Report and Written Opinion Issued in PCT Application No. PCT/US2018/033997", dated: Dec. 6, 2018, 15 Pages.
"Non Final Office Action Issued in U.S. Appl. No. 15/604,408 ", dated: Jan. 18, 2019, 22 Pages.
"Notice of Allowance Issued in U.S. Appl. No. 15/488,282", dated: Feb. 14, 2019, 11 Pages.

* cited by examiner

DISTRIBUTED TIME-TRAVEL TRACE RECORDING AND REPLAY

BACKGROUND

When writing code during the development of software applications, developers commonly spend a significant amount of time "debugging" the code to find runtime and other source code errors. In doing so, developers may take several approaches to reproduce and localize a source code bug, such as observing behavior of a program based on different inputs, inserting debugging code (e.g., to print variable values, to track branches of execution, etc.), temporarily removing code portions, etc. Tracking down runtime errors to pinpoint code bugs can occupy a significant portion of application development time.

Many types of debugging applications ("debuggers") have been developed in order to assist developers with the code debugging process. These tools offer developers the ability to trace, visualize, and alter the execution of computer code. For example, debuggers may visualize the execution of code instructions, may present code variable values at various times during code execution, may enable developers to alter code execution paths, and/or may enable developers to set "breakpoints" and/or "watchpoints" on code elements of interest (which, when reached during execution, causes execution of the code to be suspended), among other things.

An emerging form of debugging applications enable "time travel," "reverse," or "historic" debugging. With "time travel" debugging, execution of a program (e.g., executable entities such as threads) is recorded/traced by a trace application into one or more trace files. These trace file(s) can then be used to replay execution of the program later, for both forward and backward analysis. For example, "time travel" debuggers can enable a developer to set forward breakpoints/watchpoints (like conventional debuggers) as well as reverse breakpoints/watchpoints.

In order to facilitate recording, existing "time travel" debuggers force applications that are being recorded to execute as if they were single-threaded and executing at one single-threaded processor core, regardless of whether or not the application is capable of being executed multi-threaded. This done so that the existing debuggers are able to record a complete record of execution of the application, including recording a full ordering of everything that happens during execution of the application. However, this introduces severe overheads during trace recording and trace replay (i.e., processing, memory, disk space usage overheads), leads to exceptionally large trace files, and prevents recording in scenarios in which multiple processes need to be recorded—such as is the case with distributed applications.

BRIEF SUMMARY

At least some embodiments enable distributed time-travel trace recording and replay by utilizing tracing mechanisms that only need to record a partial ordering of events that occur during execution of a distributed application. This includes recording only a partial ordering of events that occur at each system at which tracing is being performed, and recording only a partial ordering of events that occur between the systems at which tracing is being performed. Notwithstanding recording a partial ordering of events (as opposed to a full ordering), the traces made according to the embodiments herein enable a full-fidelity replay of all or part of execution of the distributed application with nominal overheads.

In some embodiments, a system that performs a distributed trace recording includes a first and a second computer system. The first computer system records a first trace of execution of a first entity at one or more processors the first computer system, including recording into the first trace a first plurality of orderable events that occur during execution of the first entity. Concurrent to the first computer system recording the first trace of execution of the first entity, the second computer system records a second trace of execution of the second entity at one or more processors of the second computer system, including recording into the second trace a second plurality of orderable events that occur during execution of the second entity. The first and seconds traces are recorded at fidelity that enables complete replay of the recorded execution of their corresponding entities.

The first computer system identifies sending of a message from the first entity to the second entity, and records first information into the first trace that at least partially orders sending of the message among the first plurality of orderable events. Correspondingly, the second computer system identifies receipt of the message by the second entity and records second information into the second trace that at least partially orders receipt of the message among the second plurality of orderable events. The first information and the second information identify at least a partial ordering of the first plurality of orderable events versus the second plurality of orderable events.

In other embodiments, a method of replaying a distributed trace recording (such as one recorded by the foregoing system) includes receiving a first trace of execution of a first entity at the first computer system. The first trace includes a first plurality of orderable events that occurred during execution of the first entity at the first computer system, and is recorded at fidelity that enables complete replay of the recorded execution of the first entity. The first trace also includes first information that at least partially orders, among the first plurality of orderable events, sending of a message to a second entity at the second computer system. The method also includes receiving a second trace of execution of the second entity at the second computer system. The second trace includes a second plurality of orderable events that occurred during execution of the second entity at the second computer system, and is also recorded at fidelity that enables complete replay of the recorded execution of the second entity. The second trace includes second information that at least partially orders, among the second plurality of orderable events, receipt of the message from the first entity at the first computer system. Replay of execution of at least a portion of the first entity and the second entity based on these traces includes presenting at least one of the first plurality of orderable events relative to at least one of the second plurality of orderable events based on the first information in the first trace and the second information in the second trace.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments enable distributed time-travel trace recording and replay by utilizing tracing mechanisms that only need to record a partial ordering of events that occur during execution of a distributed application. This includes recording only a partial ordering of events that occur at each system at which tracing is being performed, and recording only a partial ordering of events that occur between the systems at which tracing is being performed. Notwithstanding recording a partial ordering of events (as opposed to a full ordering), the traces made according to the embodiments herein enable a full-fidelity replay of all or part of execution of the distributed application with nominal overheads.

Figure 1:
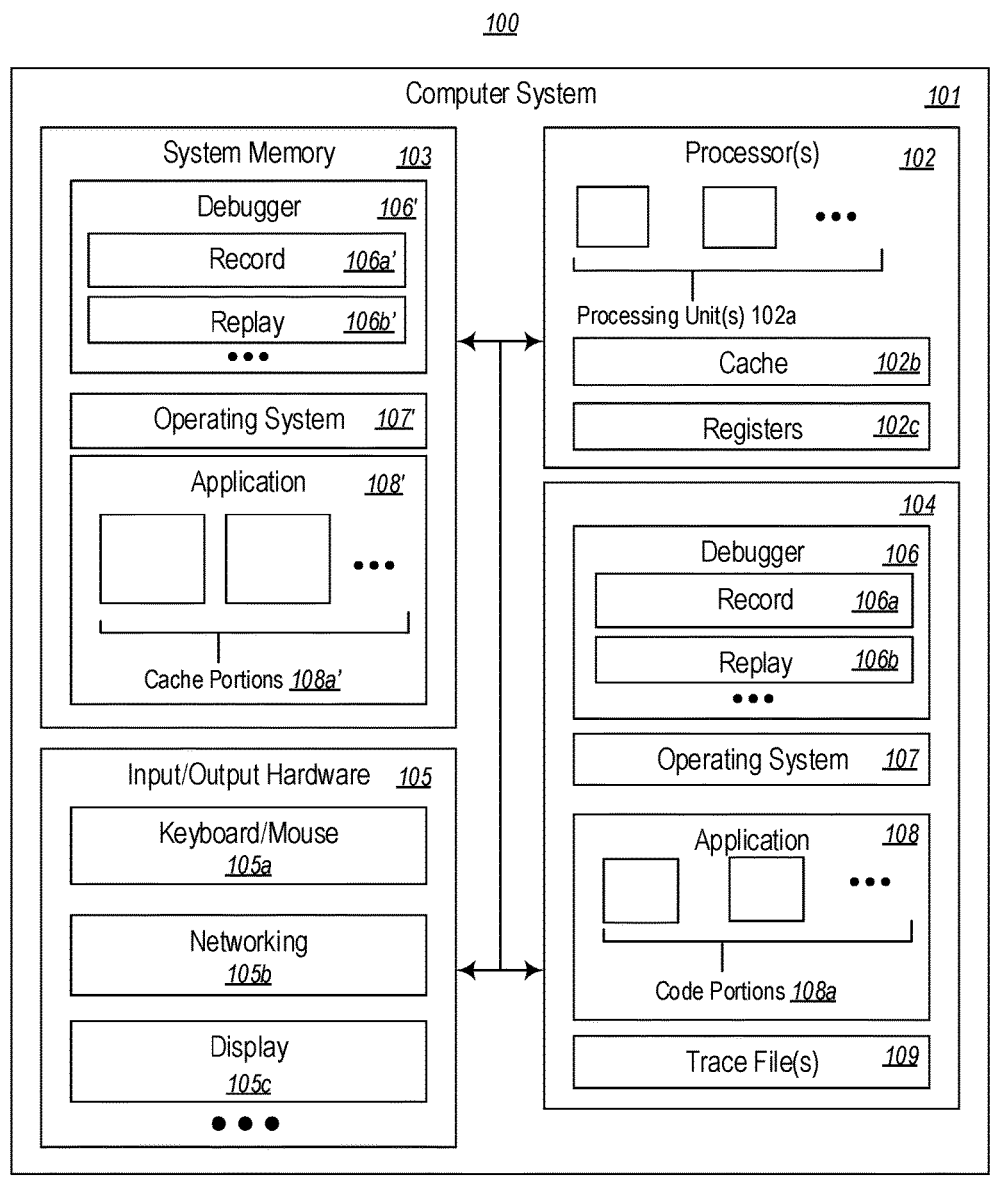
FIG. 1 illustrates an example computing environment that facilitates time-travel recording and replay.

To the accomplishment of the foregoing, FIG. 1 illustrates an example computing environment 100 that facilitates distributed time-travel trace recording and replay. As depicted, embodiments may comprise or utilize a special-purpose or general-purpose computer system 101 that includes computer hardware, such as, for example, one or more processors 102, system memory 103, one or more data stores 104, and/or input/output hardware 105 (e.g., such as the depicted keyboard/mouse hardware 105a, networking hardware 105b, and display device 105c). In some embodiments, computer system 101, and the components therein, could comprise a virtualized environment.

Embodiments within the scope of the present invention include physical and other computer-readable media for carrying or storing computer-executable instructions and/or data structures. Such computer-readable media can be any available media that can be accessed by the computer system 101. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the computer system 101 to implement the disclosed functionality of the invention. Thus, for example, computer storage devices may include the depicted system memory 103, the depicted data store 104 which can store computer-executable instructions and/or data structures, or other storage such as on-processor storage, as discussed later.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media. For example, the input/output hardware 105 may comprise networking hardware 105b (e.g., a hard-wired or wireless network interface module) that connects a network and/or data link that can be used to carry program code in the form of computer-executable instructions or data structures.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within networking hardware 105b, and then eventually transferred to the system memory 103 and/or to less volatile computer storage devices (e.g., data store 104) at the computer system 101. Thus, it should be understood that computer storage devices can be included in computer system components that also (or even primarily) utilize transmission media.

Computer-executable instructions comprise, for example, instructions and data which, when executed at the processor(s) 102, cause the computer system 101 to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The data store 104, which typically comprises durable storage, can store computer-executable instructions and/or data structures representing application code such as, for example, a debugger 106 (including, for example, a record component 106a, a replay component 106b, etc.), an operating system 107, and an application 108 (including portions of executable code 108a of the application 108). The data store 104 can also store other types of data, such as one or more trace file(s) 109. When application code is executing (e.g., using the processor(s) 102), the system memory 103 can store corresponding runtime data, such as runtime data structures, computer-executable instructions, etc. Thus, FIG. 1 illustrates the system memory 103 as including runtime debugger data 106' (runtime record data 106a', runtime replay data 106b', etc.), runtime operating system data 107', and runtime application data 108' (including, for example, runtime variables, data structures, etc. of application 108 as it executes, as well as runtime code portions 108a' which are in-memory copies of code portions 108a).

While the record component 106a and replay component 106b are depicted as being part of debugger 106, it will be appreciated that one more of these components could be a standalone application, or part of some other application. The record component 106a is usable to trace execution of an application, such as application 108 (including its executable code portions 108a), and to store trace data in the trace file(s) 109. The record component 106a may, in some embodiments, be integrated into the operating system 107, itself, into a hypervisor, or into some other runtime or virtualization technology. The record component 106a may also exist at an entirely different computer system to record traces at that computer system. Thus, the record component 106a may trace execution of code at the computer system; then the trace file(s) 109 resulting from that tracing can be transferred (e.g., using the networking hardware 105b) to the computer system 101 for replay by the replay component 106b. While the trace file(s) 109 are depicted as being stored in the data store 104, they may also be recorded exclusively or temporarily in the system memory 103, or at some other storage device.

FIG. 1 also includes a simplified representation of the internal hardware components of the processor(s) 102. As illustrated, each processor 102 includes processing unit(s) 102a. Each processing unit may be physical (i.e., a physical processor core) and/or logical (i.e., a logical core presented by a physical core that supports hyper-threading, in which more than one application thread executes at the physical core). Thus, for example, even though the processor 102 may in some embodiments include only a single physical processing unit (core), it could include two or more virtual processing units 102a presented by that single physical processing unit.

Each processing unit 102a executes processor instructions that are defined by applications (e.g., debugger 106, operating system 107, application code portions 108a, etc.), and which instructions are selected from among a predefined processor instruction set architecture. The particular instruction set architecture of a given processor 102 varies based on processor manufacturer and processor model. Common instruction set architectures include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other instruction set architectures exist and can be used by the present invention. In general, an "instruction" is the smallest externally visible (i.e., external to the processor) unit of code that is executable by a processor.

Each processing unit 102a obtains processor instructions from a shared processor cache 102b (i.e., shared by the processing units 102a), and executes the processor instructions based on data in the shared cache 102b, based on data in registers 102c, and/or without input data. In general, the shared cache 102b is a small amount (i.e., small relative to the typical amount of system memory 103) of random-access memory that stores on-processor copies of portions of the system memory 103. For example, when executing the executable code portions 108a of application 108, the shared cache 102b stores a subset of the runtime code portions 108a in a code cache section of the shared cache 102b, and stores other runtime application data 108' (e.g., variables, data structures, etc.) in a data cache section of the shared cache 102b. If the processing unit(s) 102a require data not already stored in the shared cache 102b, then a "cache miss" occurs, and that data is fetched from the system memory 103 (potentially evicting some other data from the shared cache 102b). The registers 102c are hardware based storage locations that are defined based on the instruction set architecture of the processors(s) 102.

The replay component 106b replays one or more trace file(s) 109 by executing the code of the executable entity upon which the trace file(s) 109 are based at the processor(s) 102, while supplying that code with traced data (e.g., register values, memory values, etc.) from the trace file(s) 109 at appropriate times. Thus, for example, the record component 106a may record execution of one or more code portions 108a of application 108 at the processor(s) 102, while storing trace data (e.g., memory values read by code instructions, register values supplied code instructions, etc.) in the trace files(s) 109. Then, the replay component 106b can re-execute the code portion(s) 108a at the processor(s) 102, while supplying that code with the trace data from the trace files(s) 109 so that the code is executed in the same manner that it was at trace time.

Figure 2:
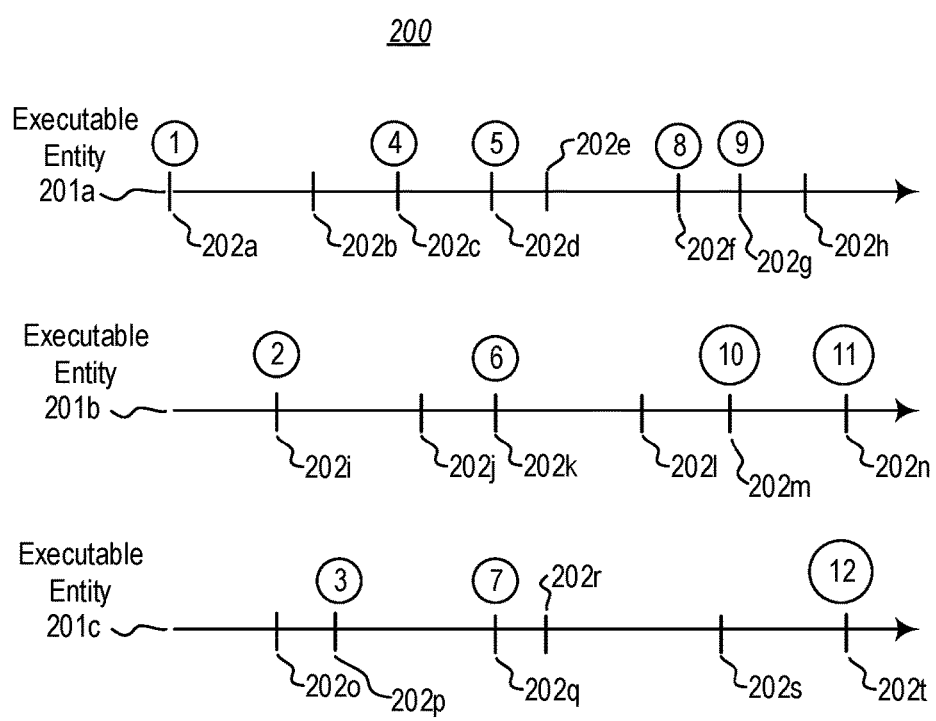
FIG. 2 illustrates an example timing diagram representing a portion of execution of three executable entities.

FIG. 2 illustrates an example timing diagram 200 representing a portion of execution of three executable entities 201a-201c (e.g., as observed during recording/tracing by the record component 106a), with execution commencing at the left end of the arrow, and proceeding to the right. For example, executable entities 201a-201c may correspond to threads of application 108a that execute code from one or more of code portions 108a. In another example, executable entities 201a-201c may correspond to threads of a kernel of the operating system 107. In FIG. 2, the executable entities 201a-201c execute in parallel (e.g., concurrently, each at a different physical or virtual processing unit 102a), though the embodiments herein can also operate in environments in which the executable entities 201a-201c execute "single threaded," sharing time at a single processing unit.

In FIG. 2, individual events occur along each arrow. For example, in general these events correspond to individual processor instructions executed as part of each executable entity. Since, on modern processors, these events can easily number in the billions for mere seconds of execution, they are not expressly depicted in FIG. 2. However, FIG. 2 does identify several events occurring across the entities (i.e., events 202a-202t) that may be of particular interest during debugging. For example, they may correspond to instructions associated with interesting memory accesses (e.g., those that would be the basis of an orderable event, and which are depicted in connection with a circled "sequencing number," as discussed later), instructions associated with certain logical boundaries (e.g., a call to or an exit from a function, a module, a kernel transition, etc.), instructions associated with exceptions, instructions associated with cache flushes, instructions associated with input/output operations (e.g., disk accesses, network accesses, etc.), instructions associated with activity of a runtime environment (e.g., a garbage collection activity), etc. Events may also be associated with data obtained from replay of the entit(ies), such as an amount of elapsed time (e.g., "wall clock" time), an amount of processing time (e.g., processor cycles used), reaching a particular instruction count, etc. While events 202a-202t are depicted as having occurred, it is noted that the record component 106a may not actually recognize each of them as being interesting events.

Figure 3:
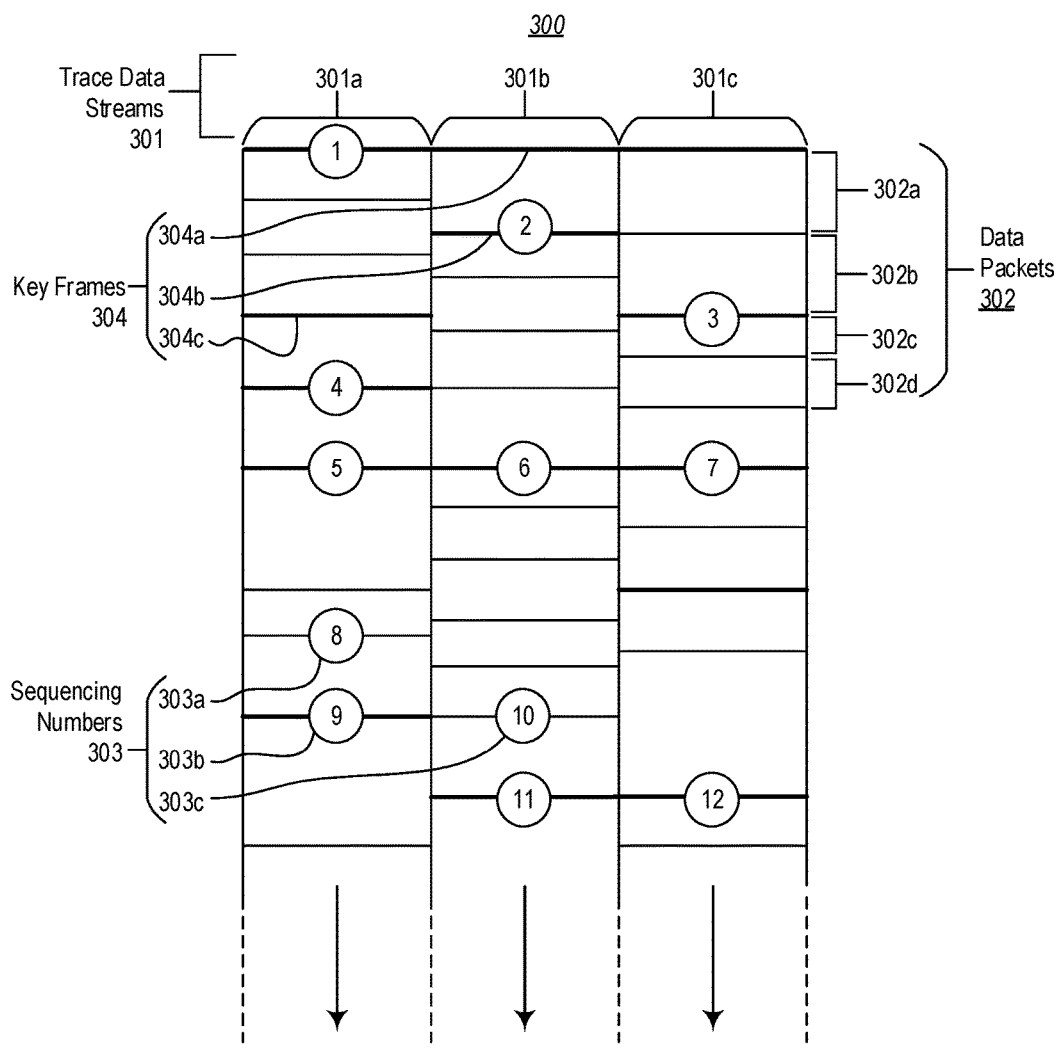
FIG. 3 illustrates an example of a trace file recorded based on the timing diagram of FIG. 2.

In view of FIG. 2, FIG. 3 illustrates one example of a trace file 300 that might be generated by the record component 106a based on the execution of the executable entities 201a-201c depicted in FIG. 2. In FIG. 3, which is based on a parallel execution of executable entities 201a-201c, the trace file 300 independently stores a different data stream recording data representing execution of a corresponding entity. Thus, in FIG. 3, the trace file 300 includes three trace data streams 301a-301c (referred to generally as trace data streams 301), each recording a trace of execution of one of executable entities 201a-201c. It will be appreciated that the trace file 300 could include any number of trace data streams 301, depending on a number of processing units 102a available at the computer system 101 and/or a number of executable entities produced by the program being traced (e.g., application 108). It will also be appreciated that the trace data streams 301 may be included in a single file trace file, or may each be stored in different related files.

Each trace data stream 301 includes a plurality of data packets storing trace data that is usable by the replay component 106b to reproduce execution of its corresponding executable entity, by supplying appropriate recorded state data (e.g., register values, memory addresses and values, etc.) to executable code of the executable entity at appropriate times. Thus, using the information in the data streams 301, and using the actual executable code of the application whose execution was traced, a full reproduction of execution of that code can be reproduced by the replay component 106b. In some embodiments, each data packet could potentially represent the execution of a plurality of code instructions. For example, a data packet may record information that identifies a code instruction to be executed, and its inputs. Then, the replay component 106b may replay a series of instructions, where each instruction in the series is dependent only on the outputs of the prior instruction(s) to it in the series, and/or other program state (e.g., register values, memory values, etc.) that were established as part of replaying prior data packet(s) in the same trace data stream 301.

One manner for recording state data in data packets of each trace data stream 301 is built upon the recognition by the inventors that processor instructions (including virtual machine "virtual processor" instructions) can generally fall into one of three categories: (1) instructions identified as "non-deterministic" as not producing predictable outputs because their outputs are not fully determined by data in general registers or memory, (2) deterministic instructions whose inputs do not depend on memory values (e.g., they depend only on processor register values, or values defined in the code itself), and (3) deterministic instructions whose inputs depend on reading values from memory. Thus, in some embodiments, storing enough state data to reproduce the execution of instructions can be accomplished with solutions to three corresponding challenges: (1) how to record the non-deterministic instructions that produce output not fully determined by their inputs, (2) how to reproduce the values of input registers for instructions depending on registers, and (3) how to reproduce the values of input memory for instructions depending on memory reads.

As a solution to the first challenge, of how to record "non-deterministic" instructions executed by an entity that do not produce fully predictable outputs because their outputs are not fully determined by data in general registers or memory, embodiments including storing in the trace data stream 301 of an entity the side-effects of execution of such instructions. As used herein, "non-deterministic" instructions include somewhat less common instructions that (i) produce non-deterministic output each time they are executed (e.g., RDTSC on INTEL processors, which write the number of processor cycles since the last processor reset into a register), that (ii) may produce a deterministic output, but depend on inputs not tracked by the record component 106a (e.g. debug registers, timers, etc.), and/or that (iii) produce processor specific information (e.g., CPUID on INTEL processors, which writes processor-specific data into registers). Storing the side-effects of execution of such instructions may include, for example, storing register values and/or memory values that were changed by execution of the instruction. In some architectures, such as from INTEL, processor features such as those found in Virtual Machine eXtensions (VMX) could be used to trap instructions for recording their side effects in the trace file 300.

As a solution to the second challenge, of reproducing the values of input registers for deterministic instructions executed by an entity (e.g., whose inputs depend only on processor register values) is straightforward, as they are the outputs of the execution of the previous instruction(s) by the entity. Recording the execution of an entire series of processor instructions in a trace data stream 301 can therefore be reduced to reproducing the register values at the beginning of the series; the trace file 300 need not store a record of which particular instructions executed in the series, or the intermediary register values. This is because the actual instructions are available in the application's code portions 108a themselves, and which are available at replay time. These instructions can therefore be supplied the recorded inputs (i.e., the recorded initial set of register values) during reply, to execute in the same manner as they did during the trace.

As a solution to the third challenge, of reproducing the values of input memory for deterministic instructions executed by an entity whose inputs depend on memory values, embodiments include recording in the trace data stream 301 of the entity the memory values that the instructions in the entity consumes (i.e., its reads)—irrespective of how the values that the instructions read were written to memory. In other words, some embodiments include recording only memory reads, but not memory writes. For example, although values may be written to memory by a current thread, by another thread (including the kernel, e.g., as part of processing an interrupt), or by a hardware device (e.g., input/output hardware 105), it is just the values that the thread's instructions read that are needed for full replay of instructions of the thread that perform reads. This is because it is the values that were read by the thread (and not necessarily all the values that were written to memory) that dictated how the thread executed. While in some embodiments, the value of each memory value read may be stored in the trace file 300, other embodiments include optimizations such as prediction techniques that attempt to predict the appropriate values without necessarily recording each read. For example, in some implementations, if the predicted value is the value that was actually read from memory, then nothing needs to be recorded in the trace file 300; however, if the predicted value does not match the value that was actually read then the value read is recorded in the trace file 300. While several prediction techniques exist, two simple prediction techniques include predicting that the next memory value read by a thread will be the same as the value previously read by the thread, or to always predict that the next memory read will have a value of zero.

FIG. 3 depicts data packets as being bounded by the horizontal lines in each data stream. Four data example packets 302 in data stream 301c are expressly labeled as data packets 302a-302d. As depicted, individual data packets may be of differing sizes, depending on trace file implementation and on the particular data stored in each packet. It will be appreciated in view of the discussion above, data that may be included in a data packet includes information for identifying a code instruction executed (e.g., a count of instructions executed since the last logged code instruction, a processor instruction counter value, etc.), register value(s) provided to that code instruction, memory address(es)/value(s) read, any side effects of executing the code instruction (e.g., resulting register values), etc. Note that while the events in FIG. 2 are shown for clarity in relation to "wall clock" time, the data packets do not necessarily indicate the relative "wall clock" time at which different events happened.

The trace file 300 includes standard data packets (which are a depicted as beginning with a light horizontal line), as well as key frames 304 (which are a depicted as beginning with heavy horizontal lines). A key frame is a type of data packet that stores sufficient information to begin replay execution of an executable entity from the point of the key frame onward, without the need of having execution/replay state from packets prior to the key frame. For example, a key frame may store values for all relevant processor registers, information necessary to reproduce memory values from that point onward, etc.

The trace file 300 includes a key frame at the beginning of each trace data stream 301 (which enables the replay component 106b to begin replay of each trace data stream), as well as additional key frames appearing throughout each trace data steam 301. Three example key frames are expressly labeled in FIG. 3 as key frame 304a (which occurs at the beginning of trace data stream 301b), key frame 304b (which occurs in connection with an orderable event, which are discussed later), and key frame 304c. In general, the record component 106a can record a key frame at any point in a data stream 301. As depicted, they need not occur at the same time across data streams, or at any particular frequency.

As mentioned above, key frames enable the replay component 106b to initiate replay of each trace data stream 301 at various points. For example, referring to data stream 301a, the replay component 106b can use key frames to initiate execution at different parts in the stream, including at the start of the data stream, at "sequencing numbers" 4, 5, and 9 (which, as depicted, each corresponds with a key frame), and at key fame 304c. Thus, key frames define different independently repayable trace sections (or segments), with each section being bounded on both ends by a key frame.

In some embodiments, when using the example format of trace file 300, the record component 106a records each data stream 301 generally independently from the other data streams during parallel execution of the code being traced. In doing so, record component 106a does not generally record the actual timing execution of events by one entity versus the timing of execution of events by another entity, since code instruction executed by one entity generally doesn't affect code instructions executing another entity. Thus, the data packets in one trace data stream 301 can generally be replayed independent of the data packets in another trace data stream 301.

The trace file 300 does, however, include some data packets identifying events that are "orderable" across the entities/data streams. These orderable events generally correspond to events that are performed by one executable entity that could affect execution of another entity, such as accessing memory shared by the entities. In FIGS. 2 and 3, orderable events are represented with a "sequencing number" that defines the relative order in which these events occurred across the entities relative to each other. Since only "orderable events" are given sequencing numbers, they provide only a partial ordering of all events recorded in the trace, as discussed later. In some embodiments, the sequencing number is a monotonically incrementing number ("MIN")—i.e., a number that increments monotonically and that that is guaranteed to not repeat. For example, the trace file 300 includes twelve sequencing numbers (depicted as circled numerals 1-12), each defining the order in which different orderable events executed across entities 201a-201c relative to each other.

In some embodiments, orderable events are identified based on a "trace memory model" that defines whether to treat events as orderable or non-orderable based on their interactions across executable entities. For example, orderable and/or non-orderable events may be defined based on how the threads interact through shared memory, their shared use of data in the shared memory, etc. Depending on implementation, a trace memory model used by the record component 106a may be weaker or stronger than a memory model used by the processor 102. The trace memory model used may be a memory model defined by a programming language used to compile code (e.g., C++ 14), or some other memory model defined expressly for purposes of tracing.

A first example trace memory model may treat as orderable only kernel calls (from user mode), traps, and exceptions. This trace memory model would have low overhead, since these operations are relatively "expensive" is their own right, they are likely tracked anyway and provide a very coarse-grained overview of ordering. A second example trace memory model may treat as orderable full fences (i.e., operations that are have both acquire & release semantics). Examples of such operations may include INTEL's "locked" instructions, kernel calls, exceptions, and traps. This memory model would provide enough ordering for nearly all cross-thread communication that happens in the process when the code uses "interlocked" types of primitives to communicate cross threads, which is common in operating systems such as WINDOWS from MICROSOFT CORPORATION). A third example trace memory model may treat all acquires and releases as orderable. This memory model may be suitable for processors based ARM instruction sets, because ARM does not treat most loads and stores as acquires or releases. On other architectures, such as from INTEL (in which a majority of memory accesses are acquires or releases), this would equate to ordering almost all memory accesses. A fourth example trace memory model may treat as orderable all memory loads. This would provide for strong ordering but may lead to decreased performance as compared to the other example memory models. The foregoing memory models have been presented as examples only, and one of ordinary skill in the art will recognize, in view of the disclosure herein, a vast variety of memory models may be chosen.

In view of the foregoing discussion of trace file 300, it will be appreciated that key frames enable the replay component 106b to initiate replay of different sections of the same trace data stream, and thus enable the replay component 106b to replay these different sections of the same trace data stream 301 independently and in parallel. Additionally, with the trace data streams 301 being recorded independently, and with the timing of events in one trace data stream being generally independent from the timing of events in another trace data stream, the replay component 106b can replay sections from different trace data streams 301 independently and in parallel.

Sequencing numbers then enable the replay component 106b to combine the results of parallel replay of these individual sections to present an accurate representation of how the entities actually executed when they were recorded. In particular, the sequencing numbers (which, as discussed above, define the relative order of orderable events across the trace data streams, and a partial ordering of all events) enable the replay component 106b to choose an ordering among the different trace sections to define a total ordering of all instructions in the trace file 300 that can be used to present results at the debugger 106. Such an ordering enables the debugger 106 to present a consistent view of program state (e.g., memory and registers) at all points in the trace, and no matter how the replay component 106b actually arrived at that point in execution (e.g., what order in which it executed individual trace sections).

Since sequencing numbers only provide a partial ordering of events, there could be many valid orderings. In general, a valid ordering places the trace sections in an order that would ensure that sequencing events are presented in proper order (i.e., in their monotonically increasing order). However, a valid ordering does not need to reproduce the exact order in which all instructions executed relative to each other at trace time. For example, in reference to FIG. 2, a valid ordering needs to ensure that an orderable event at sequencing number 3 is presented as having occurred prior to an orderable event at sequencing number 4. However, the ordering does not need to ensure that a non-orderable event executed just after sequencing number 3 by entity 201c is presented prior to a non-orderable event executed just after sequencing number 4 by entity 201a, since these events are non-orderable events at different entities.

Valid orderings need not include sections from all trace data streams (e.g., because execution of one thread may not be relevant to obtaining desired data at a given point of interest), and multiple valid orderings could be chosen. For example, suppose that reverse breakpoint on the event at sequencing number 8 is being requested. One valid ordering of sections to reach this breakpoint using only trace data streams 301a and 301c could include:

1. A section on trace 301a starting at the key frame at sequencing number 1, and ending at an instruction just prior to the key frame at sequencing number 4, then
 2. A section on trace 301c starting its beginning key frame, and ending at an instruction at the key frame at sequencing number 3, then
 3. A section on trace 301a starting at the key frame at sequencing number 4, and ending at an instruction just prior to the key frame at sequencing number 5, then
 4. A section on trace 301c starting at an instruction just after the key frame at sequencing number 3, and ending at an instruction just prior to the key frame at sequencing number 7, and then
 5. A section on trace 301a starting at the key frame at sequencing number 5, and ending at an instruction just prior to the key frame at sequencing number 9. Note that this section includes sequencing number 8 between sequencing numbers 5 and 9.

If these sections are viewed as having been replayed linearly, in the order specified, then all the instructions on trace 301a up to (but not including) sequencing number 9 are replayed, all of the instructions on trace 301c up to (but not including) sequencing number 7 are replayed, and each orderable event that was replayed is viewed as being replayed in the correct order (i.e., 1, 3, 4, 5, and 8).

Another valid ordering using all the trace data streams that could be chosen to arrive at sequencing event 8 could include:

1. A section on trace 301*a* starting at the key frame at sequencing number 1, and ending at an instruction just prior to the key frame at sequencing number 4, then
2. A section on trace 301*b* starting its beginning key frame, and ending at an instruction just prior to the key frame at sequencing number 2, then
3. A section on trace 301*c* starting its beginning key frame, and ending at an instruction just prior to the key frame at sequencing number 3, then
4. A section on trace 301*b* starting at the key frame at sequencing number 2, and ending at an instruction just prior to the key frame at sequencing number 6, then
5. A section on trace 301*c* starting at an instruction at the key frame at sequencing number 3, and ending at an instruction just prior to the key frame at sequencing number 7, then
6. A section on trace 301*a* starting at the key frame at sequencing number 4, and ending at an instruction just prior to the key frame at sequencing number 5, then
7. A section on trace 301*a* starting at the key frame at sequencing number 5, and ending at an instruction just prior to the key frame at sequencing number 9. Note again that this section includes sequencing number 8 between sequencing numbers 5 and 9.

Similarly, if these sections are viewed a having been replayed linearly, in the order specified, all the instructions on trace 301*a* up to (but not including) sequencing number 9 are replayed, all of the instructions on trace 301*b* up to (but not including) sequencing number 6 are replayed, and all of the instructions on trace 301*c* up to (but not including) sequencing number 7 are replayed, and each orderable event that was replayed is viewed as being replayed in the correct order (i.e., 1, 2, 3, 4, 5, and 8).

The replay component 106*b* need not actually perform the replay of the sections according to this determined ordering. Instead, replay component 106*b* can replay the sections in any order, so long as the results obtained by the replay are presented according to the constraints of the determined ordering. Thus, the replay component 106*b* can queue the trace sections for replay in any order, and can replay them in any order at one or more processing units 102*a*, so long as the results are presented in a valid ordering.

While the foregoing computing environment 100 and corresponding tracing techniques have been described primarily in connection with recording and replaying execution of an application 108 at a single computer system 101 (e.g., one or more threads executing at the processors 102, based on code portions 108*a*), these techniques are extendable to distributed tracing over a plurality of computer systems, and replay of those traces. For example, embodiments may extend to tracing multiple threads of an application 108 that is distributed—that is, in which one or more threads of the application 108 execute at each of a plurality of different computer systems in a coordinated manner.

Figure 4A:
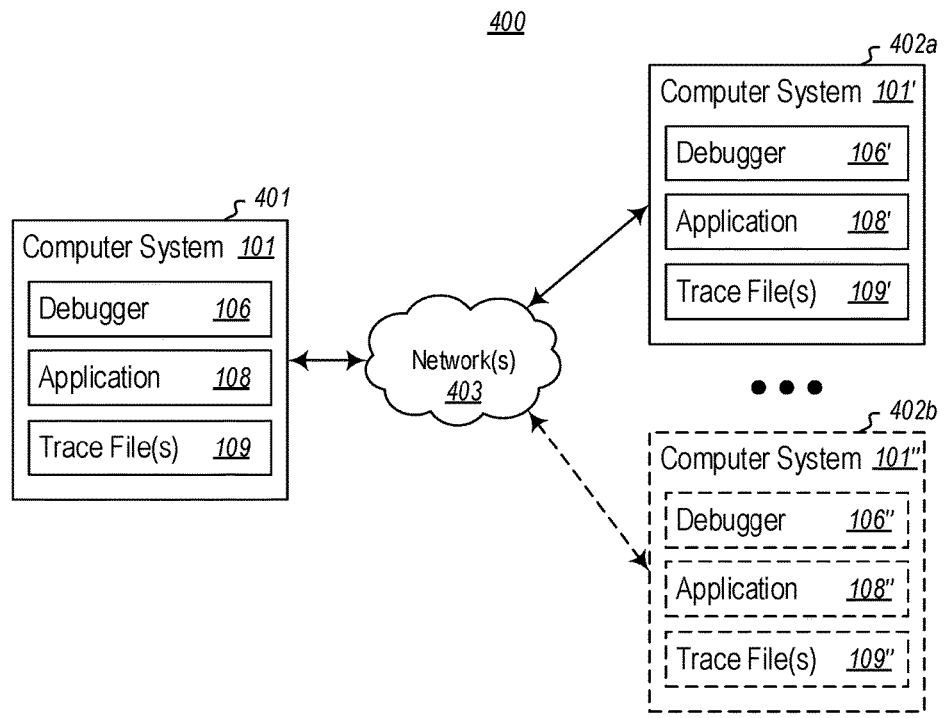
FIG. 4A illustrates an example networked computing environment that facilitates distributed time-travel recording and replay.
Figure 4B:
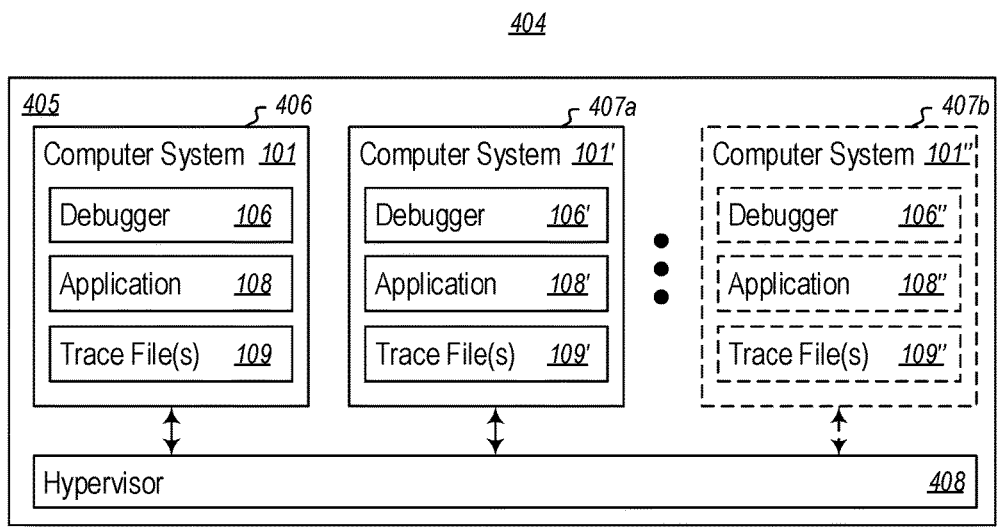
FIG. 4B illustrates an example virtualized computing environment that facilitates distributed time-travel recording and replay.

FIGS. 4A and 4B illustrate some example computing environments that facilitate distributed time-travel recording and replay. FIG. 4A illustrates a first environment 400 that facilitates distributed time-travel recording and replay over a machine boundary comprising a network 403, whereas FIG. 4B illustrates a second environment 404 that facilitates distributed time-travel recording and replay over a machine boundary comprising a hypervisor 408 (or any other software-implemented machine boundary).

In particular, FIG. 4A includes a computer system 401, such as computer system 101 of FIG. 1. Thus, as depicted, computer system 401 includes, for example, the debugger 106, application 108, and trace file(s) 109 of computer system 101. In addition, FIG. 4A includes network-connected computers system(s) 402, which are connected via network(s) 403, including computer system 402*a* plus any number (i.e., zero or more) of additional systems—represented with the ellipses and the computer system 402*b* depicted with broken lines. Each of these additional systems can also be configured in a similar manner as computer system 101. Thus, for example, computer system 402*a* is designated as computer system 101' with debugger 106', application 108', and trace file(s) 109', and system 402*b* is designated as computer system 101" with debugger 106", application 108", and trace file(s) 109".

Similarly, FIG. 4B also includes a physical computer system 405 that executes a virtualized computer system 406, such as computer system 101 of FIG. 1. Thus, as depicted, virtualized computer system 406 includes, for example, the debugger 106, application 108, and trace file(s) 109 of computer system 101. In addition, physical computer system 405 also executes additional virtualized computers system(s) 407 that are isolated from virtualized computer system 406 (and from each other) by hypervisor 408. For example, FIG. 4B depicts virtualized computer system 407*a* plus any number (i.e., zero or more) of additional virtualized systems—represented with the ellipses and the virtualized computer system 407*b* depicted with broken lines. Each of these additional systems can also be configured in a similar manner as computer system 101. Thus, for example, computer system 407*a* is designated as computer system 101' with debugger 106', application 108', and trace file(s) 109', and computer system 407*b* is designated as computer system 101" with debugger 106", application 108", and trace file(s) 109".

Notably, combinations of FIGS. 4A and 4B are possible. For example, a distributed application 108 may execute on two or more virtualized systems separated by a hypervisor 408 on the same physical computer system 405, plus on one or more additional computer systems (whether physical or virtual) that are separated by one or more networks 403. Each of the depicted computer systems (i.e., 401, 402, 406, and 407), whether physical or virtual, are configured to independently execute one or more code portions 108*a* of the distributed application 108, while recording a trace to their corresponding trace file(s) 109.

Thus, for example, in accordance with the tracing techniques discussed in connection with FIGS. 2 and 3, each system can execute one or more threads of application 108 based on one or more code portions 108*a* stored at that each system. Each system independently records execution of one or more threads that it executes into a corresponding trace data stream of its corresponding trace file(s) 109 (i.e., using the record component of its corresponding debugger). Each of these trace data streams includes data packets storing state data that enables a complete replay of the recorded portions(s) of the traced thread, and includes sequencing numbers to provide a partial ordering of "orderable" events at that system. Notably, these sequencing numbers are generally independent at each system. Thus, for example, in FIG. 4A computer system 401 has a first set of sequencing numbers, computer system 402*a* has a second set of sequencing numbers, etc. Similarly, in FIG. 4B computer system 406 may have a first set of sequencing numbers, while computer system 407*a* has a second set of sequencing numbers, etc.

Since application 108 is distributed, its components pass messages to each other during execution. This is illustrated by the arrows connecting computer systems 401 and 402 to the network(s) 403, and the arrows connecting computer systems 406 and 407 to the hypervisor 408. Note that in the case of computer systems 406 and 407, communicating through the hypervisor 408 may comprise communicating through the abstraction of virtual network interfaces. Alternatively, computer systems 406 and 407 may be aware that they are executing on a hypervisor 408. In these cases, computer systems 406 and 407 may pass message directly through the hypervisor 408, without the abstraction of virtual network interfaces. Notably, when computer systems 406 and 407 are aware that they are executing on a hypervisor 408, they may share the same set of sequencing numbers (as opposed to having distinct sets of sequencing numbers as described above). In this way, the records component(s) 106a can utilize the fact that computer systems 406 and 407 are executing on a hypervisor 408 to increase the level of synchronization of traces recorded at those systems, resulting in increased coordination of replay of those traces by the replay component 106b.

In order to facilitate a distributed recording of distributed application 108, for at least a subset of the messages passed, each system records into its corresponding trace a record of it sending and/or receiving a message. These records enable the sending of a message by one system to be matched (at least within a degree of probability) with the receipt of message by another system and/or with a reply message (if any) sent by the other computer system. Thus, these records provide a partial ordering of calls between different computer systems, which permits inquires at replay such as things along the lines of, "for a given call from system A to system B, what was the reply from system B?" These records also provide a partial orderable of events in a trace at one system versus orderable events at another system. Thus, as traces from different systems are replayed, the replay can reproduce a partial ordering of events at one system verses events of another system.

Figure 5:
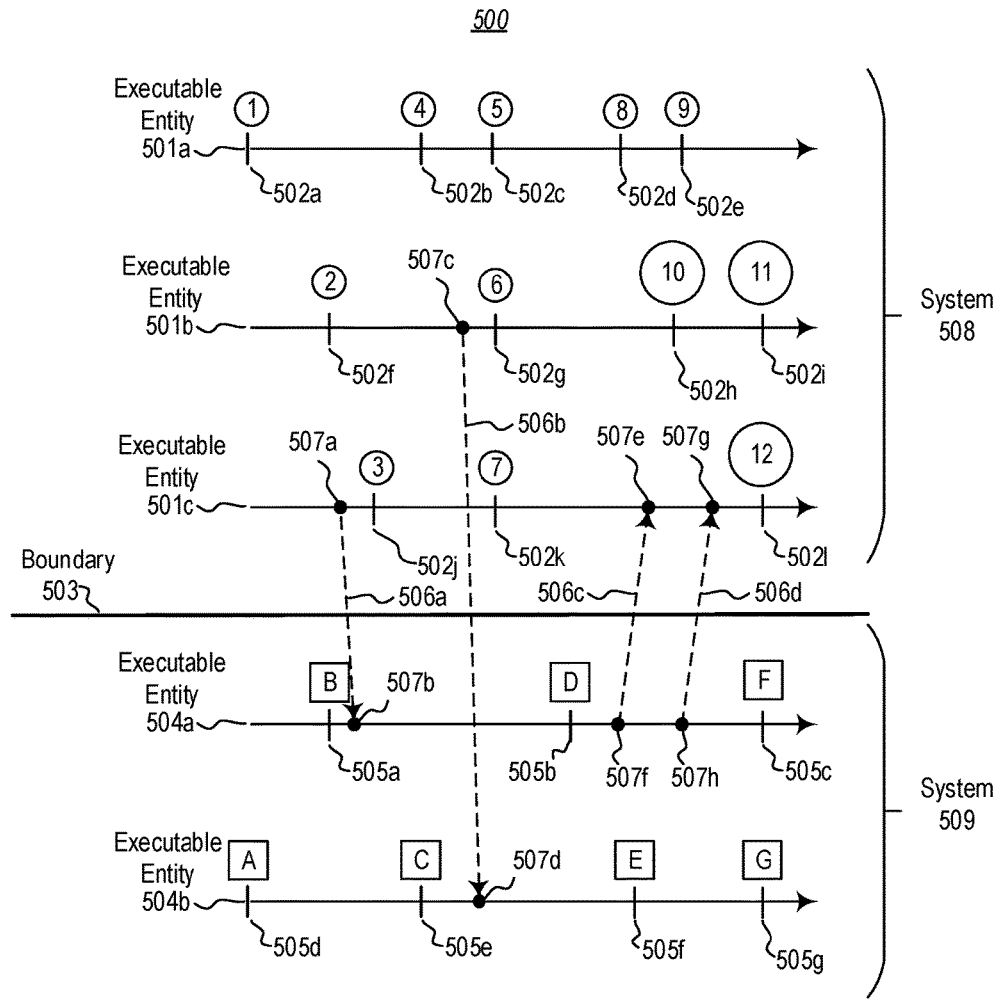
FIG. 5 illustrates an example timing diagram representing a portion of execution of entities at two different systems.

To further illustrate this concept, FIG. 5 illustrates an example timing diagram 500 representing a portion of execution of multiple entities (e.g., different instances/threads of a code portion 108a) at two different systems. For example, a first system 508 (e.g., computer system 401 or 406) concurrently executes entities 501 (i.e., 501a-501c), while a second system 509 (e.g., computer system 402a or 407a) concurrently executes entities 504 (i.e., 504a and 504b). These systems 508/509 are separated by a machine boundary 503, such as a network (e.g., network(s) 403) or a hypervisor (e.g., hypervisor 408). In FIG. 5, entities 501 execute first orderable events 502 (i.e., 502a-502l) at system 508 (i.e., sequencing numbers 1-12), while entities 504 execute second orderable events 505 (i.e., 505a-505g) at system 509 (i.e., sequencing numbers 1-7). The first orderable events 502 are designated with sequencing numbers 1-12 (in circles), while the second orderable events 505 are designated with sequencing "numbers" A-G (in squares). These different notations for sequencing numbers emphasize the fact that the two systems 508, 509 execute their own sets of orderable events—and record their own sets of sequencing numbers—independently.

FIG. 5 also illustrates messages 506 (i.e., 506a-506d) that are communicated between the entities 501 at system 508 and the entities 504 at system 509. In particular, FIG. 5 includes a message 506a sent by entity 501c at system 508 to entity 504a at system 509, a message 506b sent by entity 501b at system 508 to entity 504b at system 509, and messages 506c and 506d sent by entity 505b at system 509 to entity 501c at system 508. In connection with the sending/receipt of each of these messages, the systems 508, 509 independently record information 507 (i.e., 507a-507g) in the appropriate entity's trace that is usable to identify when the message was sent/received in relation to the entity's orderable events. This information 507 is then usable for the sending of a message by one entity to be matched with the receipt of the message by another entity, and/or for identifying any reply message(s). For example, when entity 501c sends message 506a to entity 504a, a first recording component at system 508 stores information 507a in the trace for entity 501c that identifies sending of the message. Similarly, when entity 504a receives message 506a from entity 501c, a second recording component at system 509 stores information 507b in the trace for entity 504a that identifies receipt of the message.

While shown for clarity as being distinct from a sequencing number, in some embodiments, the sending/receiving of a message is actually an orderable event, itself, that is also associated with a sequencing number. For example, when executing user mode code, means of cross-computer communication often utilizes a kernel call. Thus, for example, if application 108 is executing in user mode at system 508, then system 508 associates one or more of the following with a sequencing number: (i) information 507a associated with a kernel call to send message 506a, (ii) information 507e associated with a return from a kernel call to get a reply (e.g., message 506c), (iii) information associated with waking from waiting in the kernel for a replay, etc.

Information 507 can be used to determine at least a partial ordering of the sending/receipt of the messages between the different systems 508, 509. For example, information 507a and 507b is usable to identify the sending of message 506a by entity 501c, and to identify the receipt of message 506a by entity 504a. As an additional example, information 507c and 507d is usable to identify the sending of message 506b by entity 501b, and to identify the receipt of message 506b by entity 504b. Information 507a-507d is usable to determine that message 506b was sent by entity 501b after message 506a was sent by entity 501c, and that message 506b was received by entity 504b after message 506b was received by entity 504b.

The information 507 is also usable to identify a partial ordering of events within traces at the different systems 508, 509. For example, information 507a and 507b is usable to determine that entity 501c sent message 506a after the occurrence of the orderable events at sequencing numbers 1 and 2 on system 508, and that entity 504a received message 506 prior to the occurrence of the orderable events at sequencing numbers C-G on system 509. However, as indicated above, traces do not necessarily indicate the "wall clock" time at which different events occurred. Thus, information 507a and 507b cannot necessarily be used to determine the order of occurrence of sequencing numbers 1 and 2 at system 508 compared to order of occurrence of sequencing numbers A and B at system 509, or to determine the order of occurrence of sequencing numbers 3-12 at system 508 compared to the order of occurrence of sequencing numbers C-G at system 509.

Similarly, information 507c and 507d is usable to determine that entity 501b sent message 506b after the occurrence of the orderable events at sequencing numbers 1-4 on system 508, and that entity 504b received message 506b prior to the occurrence of the orderable events at sequencing numbers D-G on system 509. Thus, it is known from information 507c and 507d that sequencing numbers 1-4 at system 508 occurred prior to sequencing numbers D-G at system 509. However, information 507c and 507d cannot necessarily be used to determine the order of occurrence of sequencing numbers 1-4 at system 508 compared to order of occurrence of sequencing numbers A-C at system 509, or to determine the order of occurrence of sequencing numbers 5-12 at system 508 compared to the order of occurrence of sequencing numbers D-G at system 509.

In some embodiments, the information 507 captures message(s) that are sent/received in reply to another message. For example, in FIG. 5 entity 501*c* sends message 506*a* to entity 504*a*. Later, entity 504*a* sends messages 506*c* and 506*d* to entity 501*c*. It may that one, or both, of these messages 506*c*, 506*d* are in reply to message 506*a*. Thus, information 507 may include something that identifies a message as a reply message.

The particular form of the information 507 can vary, depending on implementation and the acceptable level of certainty of proper matching of messages. For example, one implementation can enable matching with absolute certainty. This implementation captures the sending of a message by one system and then modifies that message to include a unique identifier. The implementation also captures receipt of the message by another system and extracts the unique identifier from the message. For example, when message 506*a* is sent by entity 501*c*, this implementation would intercept the message prior to it leaving system 508, generate and insert a unique identifier into the message, and store that unique identifier as part of information 507*a*. Then, upon receipt of the message 506*a* at system 509, this implementation would extract the unique identifier from the message and store it as part of information 507*b*. In this way, the sending of a message can be definitively matched with the receipt of the message by matching the unique identifiers. The particular manner for intercepting the message (and inserting or extracting an identifier) can vary, depending on implementation. For example, this could be done by the entities themselves, or by a library used by the entities. In another example, this could be done by the debugger (i.e., recording component) at each system, such that the interception and message modification is transparent to the entities 501, 504.

A mentioned, information 507 may also capture which messages are reply messages. Thus, for example, using the foregoing embodiment of intercepting and instrumenting a message, one implementation may insert into a reply message a specific indication that it is a reply—including which message it is a reply to. For example, if message 506*c* is in reply to message 506*a*, system 509 may record in information 507*f* an indication of such (e.g., by referencing the unique identifier that was inserted into message 506*a*, or something derived from that identifier), and insert into message 506 (e.g., using entity 504*a*, a library, a debugger, etc.) an indication that it is in reply to message 506*a* (e.g., by referencing the unique identifier that was inserted into message 506*a*, or something derived from that identifier). Then, upon receipt of message 506*c*, system 508 can extract this indication from message 506*c* (e.g., using entity 501*c*, a library, a debugger, etc.) and store it in information 507*e*. Notwithstanding the foregoing, message 506*c* can also include its own unique identification (inserted by system 509) that is distinct from the identification from message 506*a*.

Other implementations permit a level of statistical uncertainty that messages are properly matched. For example, one implementation uses parameter matching. In this implementation, the information 507 records the function (e.g., application programming interface (API) call provided by a library or the entity being called) that was used to send or receive a message, along with one or more parameters associated with the function call. This information, taken as a whole, can comprise a "signature" that can be used to match messages that were sent with messages that were received.

For example, in connection with sending message 506*a*, the debugger at system 508 could store, in the trace for entity 501*c*, information 507*a* comprising an identification of the function that was called to send the message to entity 504*a*, along with the parameter(s) that were passed to the function. Identification could comprise, for example, a function name, a memory address of the function call, etc. Information 507*a* could also include implicit parameters, such as an IP address of system 508, a user executing entity 501*c*, a service identifier, or a user connected to a service, etc. Upon receipt of message 506*a*, the debugger (i.e., recording component) at system 509 could also store, in the trace for entity 504*a*, information 507*b* matching information 507*a*. System 509 may be aware of this information because it is available in the message 506*a*, itself, or because entity 504*a* supplied the function that was called and is therefore aware when it has been called.

Under parameter matching implementations, probable reply messages might be identified based on the order in which the calls occur, together with the signatures of the calls. For example, in FIG. 5, it is probable that one or both of messages 506*c* or 506*d* are in reply to message 506*a* and thus, during replay, one or both of the messages 506*c* or 506*d* could be presented to a user as probable replies.

It may be more challenging, however, to match calls to replies when there are multiple calls and replies. If the calls are far enough apart in time—e.g., (i) a call from entity 501*c* to entity 504*a*, then (ii) a reply from entity 504*a*, then (iii) a call from entity 501*c* to entity 504*a* using the same parameters, and finally (iv) a reply from entity 504*a*—then these calls/replies can be clearly matched and are orderable. If, however, there is some overlap in the calls—e.g., (i) a call from entity 501*c* to entity 504*a*, then (ii) another call from entity 501*c* to entity 504*a* using the same parameters, then (iii) a reply from entity 504*a*, and finally (iv) another reply from entity 504*a*—it may be unclear which reply went with which call. If the calls have the same signature and the replies both have the same value (which could be likely if the calls were the same), then it may not matter for most debugging purposes, and either reply could be presented to a user as a probable reply. If the calls have the same signature and the replies have different values, then both replies might be presented to the user.

Of course, there could be overlapping calls with different signatures, together with replies having different values. It will be appreciated that over a large trace data set with a large number of messages being passed between entities, machine learning and statistical analysis algorithms could be applied to the data in order to increase the ability to accurately match calls to replies, particularly when there is some overlap between calls and replies. For example, machine learning algorithms could observe typical replies that could match a particular call signature to identify commonalities or classifications of the replies. This data could then be used to choose a most likely choice between multiple candidate replies. This choice could then be presented to a user, potentially with a confidence level.

In addition to applying machine learning to the calls and replies themselves, embodiments also utilize information about behaviors of the code entities that are making the calls. Since the recorded traces are "full fidelity," enabling a complete replay of the recorded portions of the trace entities, embodiments can also utilize knowledge of the consumer of the return values from the messages, both before making the call and once the call returns. Thus, unlike traditional approaches, embodiments can identify such things as which instances of data structures are being used before the call or after the reply. This additional data helps raise the odds of a correct match. For example, if the usage of particular instances of data structures comes in pairs (i.e., one at call time one at return time) odds that those pairs also are call/reply pairs is high.

It will be appreciated that embodiments need not record all execution activity. For example, it could be that a subset of the entities 501 at system 508 are recorded, and/or that a subset of the entities 504 at system 508 are recorded. Further, even when execution of an entity is being recorded, less than the entire execution might be recorded. For example, some embodiments may record execution of entity 501c at system 508 and execution of entity 504a at system 509, but on system 509 only record entity 504a when it is sending or receiving a message.

It will be appreciated that while only two computer systems are shown in FIG. 5, the principles of distributed tracing described in connection with FIGS. 4A, 4B, and 5 are extendable to any number of computer systems. For example, system 508 could communicate messages with one or more other computer systems and/or system 509 could communicate messages with one or more other computer systems. Any, or all, of these systems could log the sending and receipt of these messages, using the principles described in connection with FIGS. 4A, 4B, and 5.

Figure 6:
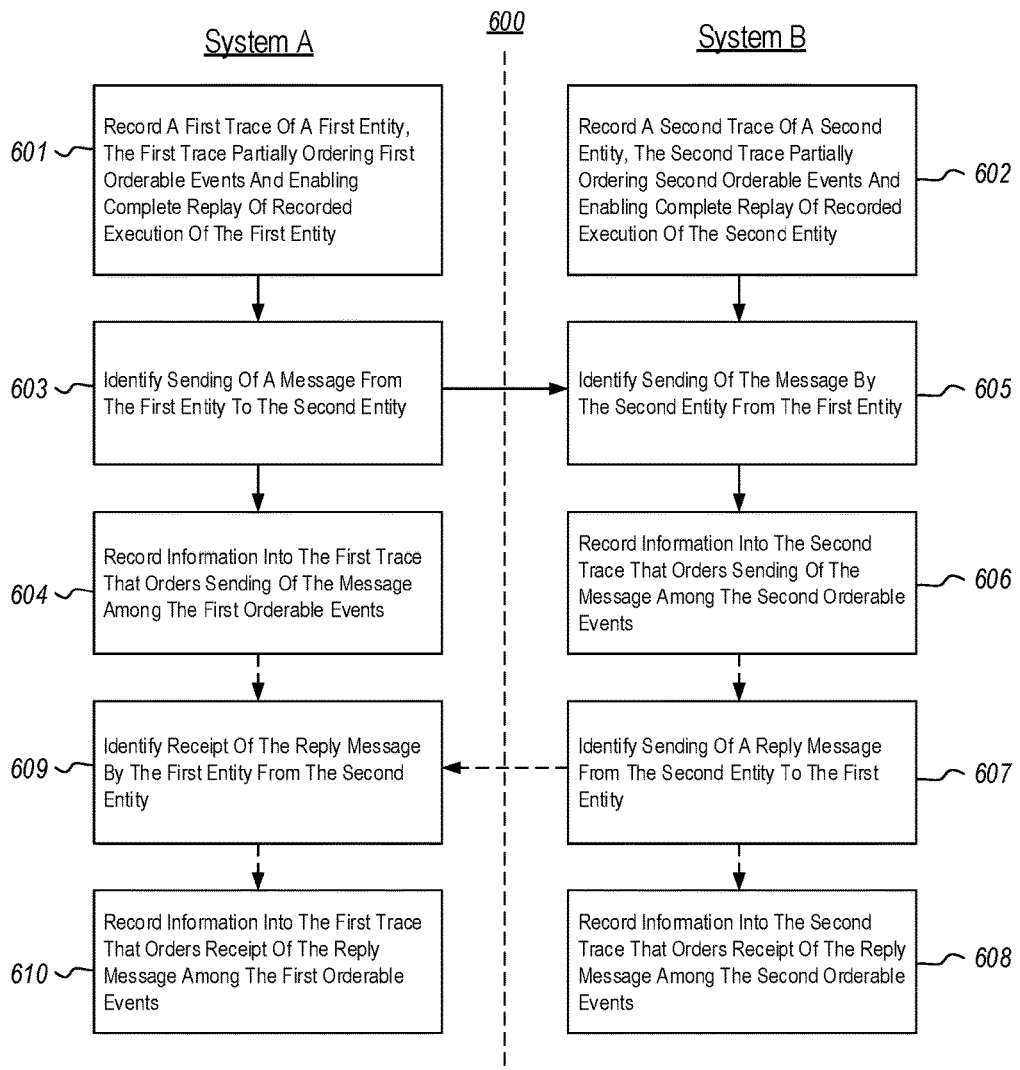
FIG. 6 illustrates a flowchart of an example method for performing a distributed trace recording.

In view of the foregoing, FIG. 6 illustrates an example of a method 600 for performing a distributed trace recording. Method 600 is described in connection with FIGS. 1-5. While method 600 is presented as a series of acts, it will be appreciated that the particular number and ordering of the acts shown is only example of distributed trace recording consistent to the embodiments herein.

Method 600 includes acts performed at two different computer systems, such as computer systems 401 and 402a of FIG. 4A (which could, for example, correspond to system 508 of FIG. 5) or computer systems 406 and 407a of FIG. 4B (which could, for example, correspond to system 509 of FIG. 5). In particular, acts shown in the left column are performed at a computer system (e.g., system 401/406) referred to as "system A," and acts shown in the right column are performed at a second computer system (e.g., system 402a/407a) "system B."

As depicted, method 600 includes an act 601 by system A of recording a first trace of a first entity, the first trace partially ordering first orderable events and enabling complete replay of recorded execution of the first entity. In some embodiments, act 601 comprises a first computer system recording a first trace of execution of a first entity at one or more processors the first computer system, including recording into the first trace a first plurality of orderable events that occur during execution of the first entity, the first trace recorded at fidelity that enables complete replay of the recorded execution of the first entity. For example, referring to FIG. 5, system 508 could execute and trace entity 501c, with the trace enabling any recorded portion of entity 501c to be fully replayed later (e.g., at system 508 or another system). As part of this recording, system 508 can include in trace of entity 501c sequencing numbers 3, 7, and 12 corresponding to orderable events that occur during its execution.

Method 600 also includes a concurrent act 602 by system B of recording a second trace of a second entity, the second trace partially ordering second orderable events and enabling complete replay of recorded execution of the second entity. In some embodiments, act 602 comprises, concurrent to the first computer system recording the first trace of execution of the first entity, a second computer system recording a second trace of execution of the second entity at one or more processors of the second computer system, including recording into the second trace a second plurality of orderable events that occur during execution of the second entity, the second trace recorded at fidelity that enables complete replay of the recorded execution of the second entity. For example, referring to FIG. 5, concurrent with system 508 tracing entity 501c, system 509 could execute and trace entity 504a, with the trace enabling any recorded portion of entity 504a to be fully replayed later (e.g., at system 509 or another system). As part of this recording, system 509 can include in trace of entity 504a sequencing numbers B, D, and F corresponding to orderable events that occur during its execution.

Method 600 can include recording any number of entities at either system A or system B. For example, system 508 could also record one or more both of entities 501a or 501b, while system 509 could also record entity 504b. When doing so, recording orderable events at each system can include recording orderable events across the recorded entities.

Method 600 also includes an act 603 by system A of identifying sending of a message from the first entity to the second entity. In some embodiments, act 603 comprises the first computer system identifying sending of a message from the first entity to a second entity external to the first computer system. For example, system 508 can identify sending of message 506a by entity 501c. This identification may be by entity 501c, by a library that entity 501c uses to send the message 506a, or by a debugger executing at system 508, or even by a post-processing of the trace.

Method 600 also includes an act 604 by system A of recording information into the first trace that orders sending of the message among the first orderable events. In some embodiments, act 604 comprises, based on identifying the sending of the message, the first computer system recording first information into the first trace that at least partially orders sending of the message among the first plurality of orderable events. For example, the debugger at system 508 can record information 507a into the trace of entity 501c, which information 507a is ordered among sequencing numbers 3, 7, and 12.

In some embodiments, information 507a could comprise an identifier that is inserted into the message 506a (i.e., instrumenting massage 506a). Thus, method 600 could include inserting a message identifier into the message prior to it being sent to system 509, and recording the message identifier into the first trace. In other embodiments, this information 507a could comprise the identity of a function called to send the message 506a, along with its parameters (i.e., for parameter matching). Thus, method 600 could include recording into the first trace an identification (e.g., name, address, etc.) of an API call used to send the message, and one or more parameters used in the call. These could be values that were passed to a function, as well as implicit parameters. Note that while acts 603 and 604 are shown as separate serial acts, these could be combined into a single act, or could be performed in parallel.

Method 600 also includes an act 605 by system B of identifying receipt of the message by the second entity from the first entity. In some embodiments, act 605 comprises the second computer system identifying receipt of the message by the second entity. For example, system 509 can identify receipt of message 506a by entity 504a. This identification may be by entity 504a, by a library that entity 504a uses to receive the message 506a, or by a debugger executing at system 509, or even by a post-processing of the trace.

Method 600 also includes an act 606 by system B of recording information into the second trace that orders receipt of the message among the second orderable events. In some embodiments, act 606 comprises, based on identifying the receipt of the message, the second computer system recording second information into the second trace that at least partially orders receipt of the message among the second plurality of orderable events, and wherein the first information and the second information identify at least a partial ordering of the first plurality of orderable events versus the second plurality of orderable events. For example, the debugger at system 509 can record information 507b into the trace of entity 504a, which information 507b is ordered among sequencing numbers B, D, and F.

Similar to the information 507a recorded by system A in act 603, in some embodiments, information 507b could comprise an identifier that is extracted from the message 506a (i.e., if it was instrumented by system A). Thus, method 600 could include system 509 extracting the message identifier from the message, and recording the message identifier into the first trace. In other embodiments, this information could comprise the identity of a function used receive the message 506a (e.g., one called by entity 501c), along with its parameters (i.e., for parameter matching). Thus, method 600 could include recording into the second trace an identification (e.g., name, address, etc.) of the API call used to send the message, and the one or more parameters used in the call. These could be values that were passed to a function, as well as implicit parameters. Note that while acts 605 and 606 are shown as separate serial acts, these could be combined into a single act, or could be performed in parallel.

As discussed, embodiments can also include recording and matching reply messages. Accordingly, method 600 may also include an act 607 by system B of identifying sending of a reply message from the second entity to the first entity, and an act 608 by system B of recording information into the second trace that orders sending of the reply message among the second orderable events. In some embodiments, acts 607 and 608 comprise the second computer system identifying sending of a reply message from the second entity to the first entity and, based on identifying the sending of the reply message, the second computer system recording third information into the second trace that at least partially orders sending of the reply message among the second plurality of orderable events and the receipt of the message. For example, system 509 can identify sending of message 506c by entity 504a, and record information 507f in the trace for entity 504a. This information 507f may be information usable for parameter matching, or could be information that is also inserted into message 506c (e.g., an identifier from instrumented message 506a or some derivative thereof).

Similarly, method 600 may also include an act 609 by system A of identifying receipt of the reply message by the first entity from the second entity, and an act 610 by system A of recording information into the first trace that orders receipt of the reply message among the first orderable events. In some embodiments, acts 609 and 610 comprise system A identifying receipt of the reply message by the first entity and, based on identifying receipt of the reply message, recording fourth information into the first trace that at least partially orders receipt of the reply message among the first plurality of orderable events and the sending of the message. For example, system 508 can identify sending of message 506c by entity 501c, and record information 507e in the trace for entity 501c. This information 507e may be information usable for parameter matching, or may be information that is extracted from message 506c (e.g., an identifier from message 506a or some derivative thereof). Using information 507a, 507b, 507e and/or 507f, one or more computer systems may be enabled to match message 506a with the reply message 506c.

Figure 7:
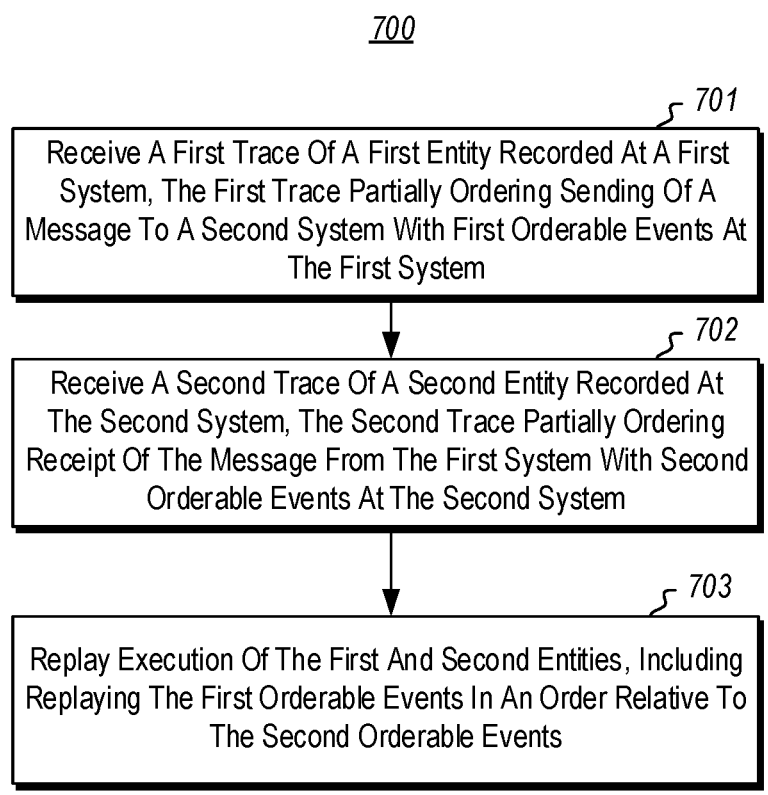
FIG. 7 illustrates a flowchart of an example method for replaying a distributed trace recording.

Embodiments also include use of the trace files generated, for example, by system A and system B to perform at least a partial replay of the first and second entities (e.g., entities 501c and 504a). For example, FIG. 7 illustrates an example of a method 700 for replaying a distributed trace recording. Method 700 is described in connection FIGS. 1-6. While method 700 is presented as a series of acts, it will be appreciated that the particular number and ordering of the acts shown is only example of distributed replay consistent to the embodiments herein.

As depicted, method 700 includes an act 701 of receiving a first trace of a first entity recorded at a first system, the first trace partially ordering sending of a message to a second system with first orderable events at the first system. In some embodiments, act 701 comprises receiving a first trace of execution of a first entity at a first computer system, the first trace including a first plurality of orderable events that occurred during execution of the first entity at the first computer system, the first trace recorded at fidelity that enables complete replay of the recorded execution of the first entity, the first trace including first information that at least partially orders, among the first plurality of orderable events, sending of a message to a second entity at a second computer system. For example, the first trace could be recorded by a first computer system, such as system A of FIG. 6, by carrying out at least acts 601, 603, and 604 of method 600.

Method 700 also includes an act 702 of receiving a second trace of a second entity recorded at the second system, the second trace partially ordering receipt of the message from the first system with second orderable events at the second system. In some embodiments, act 702 comprises receive a second trace of execution of the second entity at the second computer system, the second trace including a second plurality of orderable events that occurred during execution of the second entity at the second computer system, the second trace recorded at fidelity that enables complete replay of the recorded execution of the second entity, the second trace including second information that at least partially orders, among the second plurality of orderable events, receipt of the message from the first entity at the first computer system. For example, the second trace could be recorded by a second computer system, such as system B of FIG. 6, by carrying out at least acts 602, 605, and 606 of method 600.

Method 700 also includes an act 703 of replaying execution of the first and second entities, including replaying the first orderable events in an order relative to the second orderable events. In some embodiments, act 703 comprises, based on the first trace and the second trace, replaying execution of at least a portion of the first entity and the second entity, including presenting at least one of the first plurality of orderable events relative to at least one of the second plurality of orderable events based on the first information in the first trace and the second information in the second trace. For example, one or more computer systems, such as computer system 101, can use replay component(s) 106b to replay the first and second traces. If, for instance, the first trace corresponded to execution of entity 501c of FIG. 5, and the second trace corresponded to execution of entity 504a, then replay would include presenting an order of execution among sequencing numbers 3, 7, and 12 of the first trace relative to sequencing numbers B, D, and E of the second trace in a manner that is at least partially ordered by messages 506a, 506c, and 506d, using the concepts discussed in connection with FIG. 5.

Method 700 can also include matching messages. For example, it could include matching sending of the message from the first entity with receipt of the message by the second entity (e.g., based on information 507a and 507b), it could include matching sending of the message by the first entity with receipt of a reply message by the first entity (e.g., based on information 507a and 507e), and/or it could include matching sending of the message by the first entity with sending of a reply message by the second entity (e.g., based on information 507a and information 507f), etc.

As discussed, the traces can also be used as the basis for machine learning and/or statistical analysis. Thus, for example, method 700 could also include analyzing the first trace and the second trace to develop statistics regarding messages passed between the first entity and the second entity, analyzing the first trace and the second trace to identify a probability of different messages being matches, and/or analyzing the first trace and the second trace to identify classifications of calls and replies, and the like.

Although the subject matter has been described in language specific to structural features and/or methodological acts, it is to be understood that the subject matter defined in the appended claims is not necessarily limited to the features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A system that performs a distributed trace recording, comprising:
    a first computer system comprising computer-executable instructions configured to perform at least the following, when executed:
    record a first trace of execution of a first entity at one or more processors of the
    first computer system, including recording into the first trace a first plurality of orderable events that occur during execution of the first entity, the first trace recorded at fidelity that enables complete replay of the recorded execution of the first entity;
    identify sending of a message from the first entity to a second entity external to the first computer system; and
    based on identifying the sending of the message, record first information into the first trace that at least partially orders sending of the message among the first plurality of orderable events, the first information including an identification of a first application programming interface (API) call used to send the message and one or more parameters used in the first API call; and
    a second computer system comprising computer-executable instructions configured to perform at least the following, when executed:
    concurrent to the first computer system recording the first trace of execution of the first entity, record a second trace of execution of the second entity at one or more processors of the second computer system, including recording into the second trace a second plurality of orderable events that occur during execution of the second entity, the second trace recorded at fidelity that enables complete replay of the recorded execution of the second entity;
    identify receipt of the message by the second entity; and
    based on identifying the receipt of the message, record second information into the second trace that at least partially orders receipt of the message among the second plurality of orderable events, the second information including an identification of a second API call used to receive the message and one or more parameters used in the second API call, and wherein the first information and the second information identify at least a partial ordering of the first plurality of orderable events versus the second plurality of orderable events.

2. The system of claim 1, wherein recording the first trace of execution of the first entity comprises concurrently recording at least one other entity executing at the first computer system, and wherein at least two of the first plurality of orderable events order events across the first entity and the at least one other entity.

3. The system of claim 1, wherein recording the first trace of execution of the first entity comprises recording less than an entire execution of the first entity.

4. The system of claim 1, wherein recording the second trace of execution of the second entity comprises recording a subset of the execution of the second entity corresponding to code executed to receive the message, while refraining from recording at least a portion of the execution of the second entity.

5. The system of claim 1, wherein recording the first information into the first trace comprises inserting a message identifier into the message and recording the message identifier into the first trace, and wherein recording the second information into the second trace comprises extracting the message identifier from the message and recording the message identifier into the second trace.

6. The system of claim 5, wherein inserting the message identifier into the message comprises one of:
    inserting the message identifier by the first entity;
    inserting the message identifier by a library used by the first entity; or
    inserting the message identifier by a debugger.

7. The system of claim 1, wherein recording the one or more parameters comprises at least one of:
    recording one or more values that were passed to a function; or recording one or more implicit parameters.

8. The system of claim 1, the second computer system also comprising computer-executable instructions configured to perform at least the following, when executed:
    identify sending of a reply message from the second entity to the first entity; and
    based on identifying the sending of the reply message, record third information into the second trace that at least partially orders sending of the reply message among the second plurality of orderable events and the receipt of the message.

9. The system of claim 8, the first computer system also comprising computer-executable instructions configured to perform at least the following, when executed:
    identify receipt of the reply message by the first entity; and
    based on identifying receipt of the reply message, record fourth information into the first trace that at least partially orders receipt of the reply message among the first plurality of orderable events and the sending of the message.

10. The system of claim 9, the first computer system also comprising computer-executable instructions configured to perform at least the following, when executed:
match the message with the reply message one or more of the first information, the second information, the third information, or the fourth information.

11. The system of claim 1, wherein a machine boundary between the first computer system and the second computer system comprises a hypervisor, and wherein the first plurality of orderable events and the second plurality of orderable events share a set of sequencing numbers when recorded in the first and second traces.

12. A computer system, comprising: one or more processors; and one or more computer-readable media having stored thereon computer-executable instructions that are executable by the one or more processors to replay a distributed trace recording, including computer-executable instructions that are executable to perform at least the following:
receive a first trace of execution of a first entity at a first computer system, the first trace including a first plurality of orderable events that occurred during execution of the first entity at the first computer system, the first trace recorded at fidelity that enables complete replay of the recorded execution of the first entity, the first trace including first information that at least partially orders, among the first plurality of orderable events, sending of a message to a second entity at a second computer system, the first information including an identification of a first application programming interface (API) call used to send the message and one or more parameters used in the first API call;
receive a second trace of execution of the second entity at the second computer system, the second trace including a second plurality of orderable events that occurred during execution of the second entity at the second computer system, the second trace recorded at fidelity that enables complete replay of the recorded execution of the second entity, the second trace including second information that at least partially orders, among the second plurality of orderable events, receipt of the message from the first entity at the first computer system, the second information including an identification of a second API call used to receive the message and one or more parameters used in the second API call; and
based on the first trace and the second trace, replay execution of at least a portion of the first entity and the second entity, including presenting at least one of the first plurality of orderable events relative to at least one of the second plurality of orderable events based on the first information in the first trace and the second information in the second trace.

13. The computer system of claim 12, the computer-executable instructions also being executable to match sending of the message from the first entity with receipt of the message by the second entity.

14. The computer system of claim 13, wherein the first trace also includes third information that at least partially orders receipt of a reply message by the first entity and the second trace also includes fourth information that at least partially orders sending of the reply message by the second entity, and wherein the computer-executable instructions are also executable to match at least one of:
sending of the message by the first entity with receipt of the reply message by the first entity; or
sending of the message by the first entity with sending of the reply message by the second entity.

15. The computer system of claim 14, wherein the matching is based on one or more of:
matching identifiers inserted into one or more of the message or the reply message and stored in the first and second traces; or
matching function identifications and parameters stored in the first and second traces.

16. The computer system of claim 12, wherein the computer-executable instructions are also executable to analyze the first trace and the second trace to develop statistics regarding messages passed between the first entity and the second entity.

17. The computer system of claim 12, wherein the computer-executable instructions are also executable to analyze the first trace and the second trace to identify a probability of different messages being matches.

18. A method, implemented at a computer system that includes one or more processors, for replaying a distributed trace recording, the method comprising:
receiving a first trace of execution of a first entity at a first computer system, the first trace including a first plurality of orderable events that occurred during execution of the first entity at the first computer system, the first trace recorded at fidelity that enables complete replay of the recorded execution of the first entity, the first trace including first information that at least partially orders, among the first plurality of orderable events, sending of a message to a second entity at a second computer system, the first information including an identification of a first application programming interface (API) call used to send the message and one or more parameters used in the first API call;
receiving a second trace of execution of the second entity at the second computer system, the second trace including a second plurality of orderable events that occurred during execution of the second entity at the second computer system, the second trace recorded at fidelity that enables complete replay of the recorded execution of the second entity, the second trace including second information that at least partially orders, among the second plurality of orderable events, receipt of the message from the first entity at the first computer system the second information including an identification of a second API call used to receive the message and one or more parameters used in the second API call; and
based on the first trace and the second trace, replaying execution of at least a portion of the first entity and the second entity, including presenting at least one of the first plurality of orderable events relative to at least one of the second plurality of orderable events based on the first information in the first trace and the second information in the second trace.

19. The method of claim 18, wherein the first trace also includes third information that at least partially orders receipt of a reply message by the first entity and the second trace also includes fourth information that at least partially orders sending of the reply message by the second entity, and wherein the method further comprises at least one of:
matching sending of the message by the first entity with receipt of the reply message by the first entity; or matching sending of the message by the first entity with sending of the reply message by the second entity.

\* \* \* \* \*